(12) United States Patent
Hao et al.

(10) Patent No.: US 12,132,549 B2
(45) Date of Patent: Oct. 29, 2024

(54) COMPRESSED CSI FEEDBACK FOR NON-CONTIGUOUS FREQUENCY RESOURCES

(71) Applicant: QUALCOMM Incorporated, San Diego, CA (US)

(72) Inventors: Chenxi Hao, Beijing (CN); Liangming Wu, Beijing (CN); Qiaoyu Li, Beijing (CN); Min Huang, Beijing (CN); Joseph Binamira Soriaga, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 539 days.

(21) Appl. No.: 17/298,913

(22) PCT Filed: Dec. 11, 2019

(86) PCT No.: PCT/CN2019/124534
§ 371 (c)(1),
(2) Date: Jun. 1, 2021

(87) PCT Pub. No.: WO2020/119715
PCT Pub. Date: Jun. 18, 2020

(65) Prior Publication Data
US 2022/0038159 A1 Feb. 3, 2022

(30) Foreign Application Priority Data
Nov. 12, 2018 (WO) ................ PCN/CN2018/120197

(51) Int. Cl.
*H04B 7/06* (2006.01)
*H04B 7/0456* (2017.01)
(Continued)

(52) U.S. Cl.
CPC ......... *H04B 7/0658* (2013.01); *H04B 7/0469* (2013.01); *H04B 7/0478* (2013.01);
(Continued)

(58) Field of Classification Search
None
See application file for complete search history.

(56) References Cited

U.S. PATENT DOCUMENTS 10,404,338 B2 9/2019 Wei et al.
2007/0153731 A1 7/2007 Fine
(Continued)

FOREIGN PATENT DOCUMENTS

CN 101400074 A 4/2009
CN 102325013 A 1/2012
(Continued)

OTHER PUBLICATIONS

"CSI Enhancement for MU-MIMO Support" 3GPP TSG RAN WG1 Meeting#95 R1-1813913 (Year: 2018).*
(Continued)

*Primary Examiner* — Jay L Vogel
(74) *Attorney, Agent, or Firm* — QUALCOMM Incorporated

(57) ABSTRACT

Certain aspects of the present disclosure provide techniques for a basis report for compressed channel state information (CSI) feedback with a non-contiguous subband configuration. A method for wireless communication by a user equipment (UE) includes receiving a CSI report configuration configuring the UE for reporting precoding matrix information including, a plurality of selected beams, a frequency domain compression matrix for each of the beams at each of a plurality of taps in the time domain, and a subset of a plurality of linear combination coefficients associated with the frequency domain compression matrices and beams. The
(Continued)

$$F_i^H = \begin{bmatrix} f_0^H \\ f_1^H \\ f_2^H \\ \vdots \\ f_{N_3O_3}^H \end{bmatrix} = \begin{bmatrix} e^{\frac{j2\pi \cdot 0 \cdot 0}{N_3O_3}} & e^{\frac{j2\pi \cdot 0 \cdot 1}{N_3O_3}} & \cdots & e^{\frac{j2\pi \cdot 0 \cdot (N_3-1)}{N_3O_3}} \\ e^{\frac{j2\pi \cdot 1 \cdot 0}{N_3O_3}} & e^{\frac{j2\pi \cdot 1 \cdot 1}{N_3O_3}} & \cdots & e^{\frac{j2\pi \cdot 1 \cdot (N_3-1)}{N_3O_3}} \\ e^{\frac{j2\pi \cdot 2 \cdot 0}{N_3O_3}} & e^{\frac{j2\pi \cdot 2 \cdot 1}{N_3O_3}} & \cdots & e^{\frac{j2\pi \cdot 2 \cdot (N_3-1)}{N_3O_3}} \\ \vdots & \vdots & \ddots & \vdots \\ e^{\frac{j2\pi \cdot N_3O_3 \cdot 0}{N_3O_3}} & e^{\frac{j2\pi \cdot N_3O_3 \cdot 1}{N_3O_3}} & \cdots & e^{\frac{j2\pi \cdot N_3O_3 \cdot (N_3-1)}{N_3O_3}} \end{bmatrix}$$

UE receives a configuration of non-contiguous frequency resources for CSI reporting. The UE may perform frequency domain compression of the precoding matrix information using a truncated frequency domain compression matrix or performing separate frequency domain compression of the precoding matrix information for each set of contiguous frequency resources.

26 Claims, 13 Drawing Sheets

(51) Int. Cl.
  *H04L 5/00* (2006.01)
  *H04W 28/06* (2009.01)
(52) U.S. Cl.
  CPC ......... *H04B 7/0626* (2013.01); *H04B 7/0639* (2013.01); *H04B 7/066* (2013.01); *H04B 7/0695* (2013.01); *H04L 5/0037* (2013.01); *H04L 5/0041* (2013.01); *H04W 28/06* (2013.01)

(56) References Cited

U.S. PATENT DOCUMENTS

| | | | |
|---|---|---|---|
| 2008/0019457 | A1 | 1/2008 | Waters et al. |
| 2013/0100911 | A1 | 4/2013 | Lv et al. |
| 2016/0142117 | A1 | 5/2016 | Rahman et al. |
| 2018/0092102 | A1* | 3/2018 | Pefkianakis ......... H04B 7/0452 |
| 2018/0175993 | A1* | 6/2018 | Onggosanusi ....... H04B 7/0486 |
| 2018/0227028 | A1 | 8/2018 | Lee |
| 2019/0103904 | A1* | 4/2019 | Song ..................... H04B 7/0417 |
| 2020/0028555 | A1* | 1/2020 | Rahman .............. H04L 27/2634 |
| 2021/0399781 | A1* | 12/2021 | Rupasinghe ......... H04B 7/0641 |

FOREIGN PATENT DOCUMENTS

| | | |
|---|---|---|
| CN | 104243003 A | 12/2014 |
| CN | 106160818 A | 11/2016 |
| CN | 107204794 A | 9/2017 |
| CN | 108496400 A | 9/2018 |
| WO | 2014198068 | 12/2014 |

OTHER PUBLICATIONS

"3rd Generation Partnership Project, Technical Specification Group Radio Access Network, NR, Physical Layer Procedures for Data (Release 15)", 3GPP Standard, Technical Specification, 3GPP TS 138.214, 3rd Generation Partnership Project (3GPP), Mobile Competence Centre, 650, Route Des Lucioles, F-06921 Sophia-Antipolis Cedex, France,, No. V15.3.0, Oct. 1, 2018 (Oct. 1, 2018), ETSI Technical Specification 138 214, V15.3.0, XP051487513, pp. 1-99, Section 5.2 and corresponding subsections.

Samsung: "CSI Enhancement for MU-MIMO", 3GPP TSG RAN WG1 Meeting #95, R1-1813001, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, 5 Pages, XP051554980.

Supplementary European Search Report—EP19897364—Search Authority—The Hague—Jul. 15, 2022.

International Search Report and Written Opinion—PCT/CN2018/120197—ISA/EPO—Sep. 10, 2019.

International Search Report and Written Opinion—PCT/CN2019/124534—ISA/EPO—Mar. 10, 2020.

* cited by examiner

| BWP size (RBs) | Subband size (RBs) |
|---|---|
| < 24 | N/A |
| 24 - 72 | 4, 8 |
| 73 - 144 | 8, 16 |
| 145 - 275 | 16, 32 |

$$F_i^H = \begin{bmatrix} f_0^H \\ f_1^H \\ f_2^H \\ \vdots \\ f_{N_3 O_3} \end{bmatrix} = \begin{bmatrix} e^{\frac{j2\pi \cdot 0 \cdot 0}{N_3 O_3}} & e^{\frac{j2\pi \cdot 0 \cdot 1}{N_3 O_3}} & \cdots & e^{\frac{j2\pi \cdot 0 \cdot (N_3-1)}{N_3 O_3}} \\ e^{\frac{j2\pi \cdot 1 \cdot 0}{N_3 O_3}} & e^{\frac{j2\pi \cdot 1 \cdot 1}{N_3 O_3}} & \cdots & e^{\frac{j2\pi \cdot 1 \cdot (N_3-1)}{N_3 O_3}} \\ e^{\frac{j2\pi \cdot 2 \cdot 0}{N_3 O_3}} & e^{\frac{j2\pi \cdot 2 \cdot 1}{N_3 O_3}} & \cdots & e^{\frac{j2\pi \cdot 2 \cdot (N_3-1)}{N_3 O_3}} \\ \vdots & \vdots & \ddots & \vdots \\ e^{\frac{j2\pi \cdot N_3 O_3 \cdot 0}{N_3 O_3}} & e^{\frac{j2\pi \cdot N_3 O_3 \cdot 1}{N_3 O_3}} & \cdots & e^{\frac{j2\pi \cdot N_3 O_3 \cdot (N_3-1)}{N_3 O_3}} \end{bmatrix}$$

FIG. 5

$$\begin{bmatrix} e^{\frac{j2\pi \cdot 0 \cdot 0}{N_3 O_3}} & e^{\frac{j2\pi \cdot 0 \cdot 5}{N_3 O_3}} & e^{\frac{j2\pi \cdot 0 \cdot 6}{N_3 O_3}} & e^{\frac{j2\pi \cdot 0 \cdot 7}{N_3 O_3}} & e^{\frac{j2\pi \cdot 0 \cdot 8}{N_3 O_3}} & e^{\frac{j2\pi \cdot 0 \cdot 9}{N_3 O_3}} & e^{\frac{j2\pi \cdot 0 \cdot 10}{N_3 O_3}} & e^{\frac{j2\pi \cdot 0 \cdot 15}{N_3 O_3}} \\ e^{\frac{j2\pi \cdot 1 \cdot 0}{N_3 O_3}} & e^{\frac{j2\pi \cdot 1 \cdot 5}{N_3 O_3}} & e^{\frac{j2\pi \cdot 1 \cdot 6}{N_3 O_3}} & e^{\frac{j2\pi \cdot 1 \cdot 7}{N_3 O_3}} & e^{\frac{j2\pi \cdot 1 \cdot 8}{N_3 O_3}} & e^{\frac{j2\pi \cdot 1 \cdot 9}{N_3 O_3}} & e^{\frac{j2\pi \cdot 1 \cdot 10}{N_3 O_3}} & e^{\frac{j2\pi \cdot 1 \cdot 15}{N_3 O_3}} \\ \vdots & \vdots & \vdots & \vdots & \vdots & \vdots & \vdots & \vdots \\ e^{\frac{j2\pi \cdot N_3 O_3 \cdot 0}{N_3 O_3}} & e^{\frac{j2\pi \cdot N_3 O_3 \cdot 5}{N_3 O_3}} & e^{\frac{j2\pi \cdot N_3 O_3 \cdot 6}{N_3 O_3}} & e^{\frac{j2\pi \cdot N_3 O_3 \cdot 7}{N_3 O_3}} & e^{\frac{j2\pi \cdot N_3 O_3 \cdot 8}{N_3 O_3}} & e^{\frac{j2\pi \cdot N_3 O_3 \cdot 9}{N_3 O_3}} & e^{\frac{j2\pi \cdot N_3 O_3 \cdot 10}{N_3 O_3}} & e^{\frac{j2\pi \cdot N_3 O_3 \cdot 15}{N_3 O_3}} \end{bmatrix}$$

FIG. 7

$$\begin{bmatrix} \begin{matrix} e^{\frac{j2\pi \cdot 0 \cdot 0}{N_{3,0}O_3}} & \cdots & e^{\frac{j2\pi \cdot 0 \cdot 5}{N_{3,0}O_3}} \\ \vdots & \ddots & \vdots \\ e^{\frac{j2\pi \cdot (N_{3,0}O_3-1) \cdot 0}{N_{3,0}O_3}} & \cdots & e^{\frac{j2\pi \cdot (N_{3,0}O_3-1) \cdot 5}{N_{3,0}O_3}} \end{matrix} & 0 \\ 0 & \begin{matrix} e^{\frac{j2\pi \cdot 0 \cdot 0}{N_{3,0}O_3}} & \cdots & e^{\frac{j2\pi \cdot 0 \cdot 5}{N_{3,0}O_3}} \\ \vdots & \ddots & \vdots \\ e^{\frac{j2\pi \cdot (N_{3,0}O_3-1) \cdot 0}{N_{3,0}O_3}} & \cdots & e^{\frac{j2\pi \cdot (N_{3,0}O_3-1) \cdot 5}{N_{3,0}O_3}} \end{matrix} \end{bmatrix}$$

FIG. 9

COMPRESSED CSI FEEDBACK FOR NON-CONTIGUOUS FREQUENCY RESOURCES

CROSS REFERENCE TO RELATED APPLICATIONS

This application is a national stage application under 35 U.S.C. 371 of PCT/CN2019/124534, filed Dec. 11, 2019, which claims priority to International Patent Cooperation Treaty Application No. PCT/CN2018/120197, filed Dec. 11, 2018, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for a basis report for compressed channel state information (CSI) feedback with a non-contiguous frequency resource configuration.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a channel state information (CSI) report configuration. The CSI report configuration configures the UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The method generally includes receiving a configuration of non-contiguous frequency resources for CSI reporting. The method generally includes performing frequency domain compression of the precoding matrix information using a truncated frequency domain compression matrix.

Certain aspects provide another method for wireless communication by a UE. The method generally includes receiving a CSI report configuration. The CSI report configuration configures the UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The method generally includes receiving a configuration of non-contiguous sets of contiguous frequency resources for CSI reporting. The method generally includes performing separate frequency domain compression of the precoding matrix information for each set of contiguous frequency resources.

Certain aspects provide a method for wireless communication by a base station (BS). The method generally includes sending a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The method generally includes sending the UE a configuration of non-contiguous frequency resources for CSI reporting. The method generally includes performing frequency domain decompression of the precoding matrix information from the UE using a truncated frequency domain compression matrix to obtain the precoding matrix information.

Certain aspects provide another method for wireless communication by a BS. The method generally includes sending a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The method generally includes sending the UE a configuration of non-contiguous sets of contiguous frequency resources for CSI reporting. The method generally includes performing separate frequency domain decompression of the precoding matrix information from the UE for each set of contiguous frequency resources to obtain the precoding matrix information.

Certain aspects provide an apparatus for wireless communication. The apparatus generally includes a memory and at least one processor coupled with the memory. The at least one processor is generally configured to receive a CSI report configuration. The CSI report configuration configures the apparatus for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The at least one processor is generally configured to receive a configuration of non-contiguous frequency resources for CSI reporting. The at least one processor is generally configured to perform frequency domain compression of the precoding matrix information using a truncated frequency domain compression matrix.

Certain aspects provide another apparatus for wireless communication. The apparatus generally includes a memory and at least one processor coupled with the memory. The at least one processor is generally configured to receive a CSI report configuration. The CSI report configuration configures the apparatus for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The at least one processor is generally configured to receive a configuration of non-contiguous sets of contiguous frequency resources for CSI reporting. The at least one processor is generally configured to perform separate frequency domain compression of the precoding matrix information for each set of contiguous frequency resources.

Certain aspects provide an apparatus for wireless communication. The apparatus generally includes a memory and at least one processor coupled with the memory. The at least one processor is generally configured to send a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The at least one processor is generally configured to send the UE a configuration of non-contiguous frequency resources for CSI reporting. The at least one processor is generally configured to perform frequency domain decompression of the precoding matrix information from the UE using a truncated frequency domain compression matrix to obtain the precoding matrix information.

Certain aspects provide an apparatus for wireless communication. The apparatus generally includes a memory and at least one processor coupled with the memory. The at least one processor is generally configured to send a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The at least one processor is generally configured to send the UE a configuration of non-contiguous sets of contiguous frequency resources for CSI reporting. The at least one processor is generally configured to perform separate frequency domain decompression of the precoding matrix information from the UE for each set of contiguous frequency resources to obtain the precoding matrix information.

Certain aspects provide an apparatus for wireless communication. The apparatus generally includes means for receiving a CSI report configuration. The CSI report configuration configures the apparatus for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The apparatus generally includes means for receiving a configuration of non-contiguous frequency resources for CSI reporting. The apparatus generally includes means for performing frequency domain compression of the precoding matrix information using a truncated frequency domain compression matrix.

Certain aspects provide another apparatus for wireless communication. The apparatus generally includes means for receiving a CSI report configuration. The CSI report configuration configures the apparatus for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The apparatus generally includes means for receiving a configuration of non-contiguous sets of contiguous frequency resources for CSI reporting. The apparatus generally includes means for performing separate frequency domain compression of the precoding matrix information for each set of contiguous frequency resources.

Certain aspects provide an apparatus for wireless communication. The apparatus generally includes means for sending a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The apparatus generally includes means for sending the UE a configuration of non-contiguous frequency resources for CSI reporting. The apparatus generally includes means for performing frequency domain decompression of the precoding matrix information from the UE using a truncated frequency domain compression matrix to obtain the precoding matrix information.

Certain aspects provide an apparatus for wireless communication. The apparatus generally includes means for sending a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The apparatus generally includes means for sending the UE a configuration of non-contiguous sets of contiguous frequency resources for CSI reporting. The apparatus generally includes means for performing separate frequency domain decompression of the precoding matrix information from the UE for each set of contiguous frequency resources to obtain the precoding matrix information.

Certain aspects provide a computer readable medium storing computer executable code thereon for wireless communication. The computer readable medium generally includes code for receiving a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The computer readable medium generally includes code for receiving a configuration of non-contiguous frequency resources for CSI reporting. The computer readable medium generally includes code for performing frequency domain compression of the precoding matrix information using a truncated frequency domain compression matrix.

Certain aspects provide a computer readable medium storing computer executable code thereon for wireless communication. The computer readable medium generally includes code for receiving a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The computer readable medium generally includes code for receiving a configuration of non-contiguous sets of contiguous frequency resources for CSI reporting. The computer readable medium generally includes code for performing separate frequency domain compression of the precoding matrix information for each set of contiguous frequency resources.

Certain aspects provide a computer readable medium storing computer executable code thereon for wireless communication. The computer readable medium generally includes code for sending a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The computer readable medium generally includes code for sending the UE a configuration of non-contiguous frequency resources for CSI reporting. The computer readable medium generally includes code for performing frequency domain decompression of the precoding matrix information from the UE using a truncated frequency domain compression matrix to obtain the precoding matrix information.

Certain aspects provide a computer readable medium storing computer executable code thereon for wireless communication. The computer readable medium generally includes code for sending a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The computer readable medium generally includes code for sending the UE a configuration of non-contiguous sets of contiguous frequency resources for CSI reporting. The computer readable medium generally includes code for performing separate frequency domain decompression of the precoding matrix information from the UE for each set of contiguous frequency resources to obtain the precoding matrix information.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is an example frequency domain compression matrix for CSI reporting, in accordance with certain aspects of the present disclosure.

FIG. 7 is an example truncated frequency domain compression matrix for CSI reporting, in accordance with certain aspects of the present disclosure.

FIG. 9 illustrates example frequency domain compression basis reporting for non-contiguous subbands, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
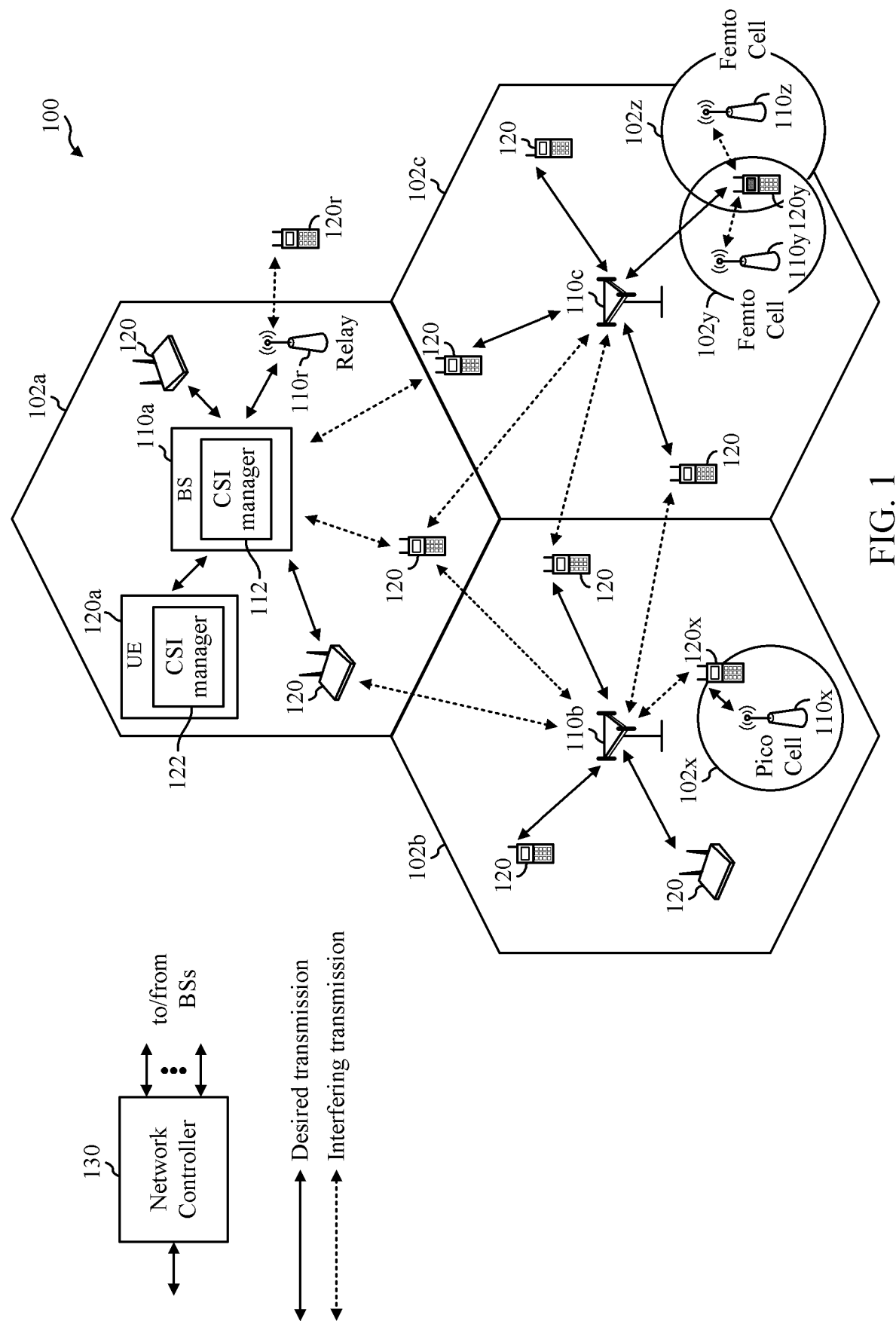
FIG. 1 is a block diagram conceptually illustrating an example telecommunications system, in accordance with certain aspects of the present disclosure.

Aspects of the present disclosure provide apparatus, methods, processing systems, and computer readable mediums for a basis report for compressed channel state information (CSI) feedback with non-contiguous subband configuration.

In some cases, a user equipment (UE) may be configured with non-contiguous frequency resources for CSI reporting. For an enhanced linear combination codebook, which uses frequency domain (FD) compression for providing compressed CSI feedback, a nominal discrete Fourier transform (DFT) based matrix for the FD compression may not match with the configured subbands.

Aspects of the present disclosure provide for using a truncated DFT-based matrix for the FD compression when the UE is configured with non-consecutive subbands. The nominal DFT-based matrix can be truncated based on the subband configuration and number of reported subbands.

Aspects of the present disclosure provide for performing separate compression on contiguous sets of configured subbands when the UE is configured with non-consecutive subbands.

The following description provides examples basis report for compressed CSI feedback with non-contiguous subbands, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later NR technologies.

New radio (NR) access (e.g., 5G NR technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 subcarriers. The system bandwidth may also be partitioned into subbands. For example, a subband may cover multiple RBs. NR may support a base subcarrier spacing (SCS) of 15 KHz and other subcarrier spacing may be defined with respect to the base SCS, for example, 30 kHz, 60 kHz, 120 kHz, 240 kHz, etc. In NR, a subframe is 1 ms, but the basic TTI is referred to as a slot. A subframe contains a variable number of slots (e.g., 1, 2, 4, 8, 16, . . . slots) depending on the SCS. The symbol, slot, and CP lengths scale with the SCS.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be a 5G NR network.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a cell, which may be stationary or may move according to the location of a mobile BS 10. The BSs 110a may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The BSs 110 communicate with UEs 120 a-y (e.g., each also individually referred to herein as UE 120 or collectively as UEs 120) that may be dispersed throughout the wireless communication network 100. Each UE may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relays transmissions between UEs 120, to facilitate communication between devices.

As will be described in more detail below, BSs 110 and UEs 120 in the wireless communication may be configured for CSI reporting. As shown in FIG. 1, the UE 120a includes a CSI manager 122. The CSI manager 122 may be configured to receive a CSI report configuration from the BS 110a. The CSI report configuration configures the UE 120a for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The CSI manager 122 may be configured to receive a configuration of non-contiguous frequency resources for CSI reporting. The CSI manager 122 may be configured to perform frequency compression of the precoding matrix information using a truncated frequency domain compression matrix. The CSI manager 122 may be configured to perform separate frequency compression of the precoding matrix information for each set of contiguous frequency resources. As shown in FIG. 1, the BS 110a includes a CSI manager 112. The CSI manager 112 may be configured to configure the UE 110a with the CSI report configuration; configured the UE 120a with the non-contiguous frequency resource for CSI reporting; receive a CSI report from the UE 20a; and perform frequency decompression to obtain the precoding matrix information using a truncated frequency domain compression matrix and/or using separate frequency domain matrices for each set of contiguous frequency resources.

Figure 2:
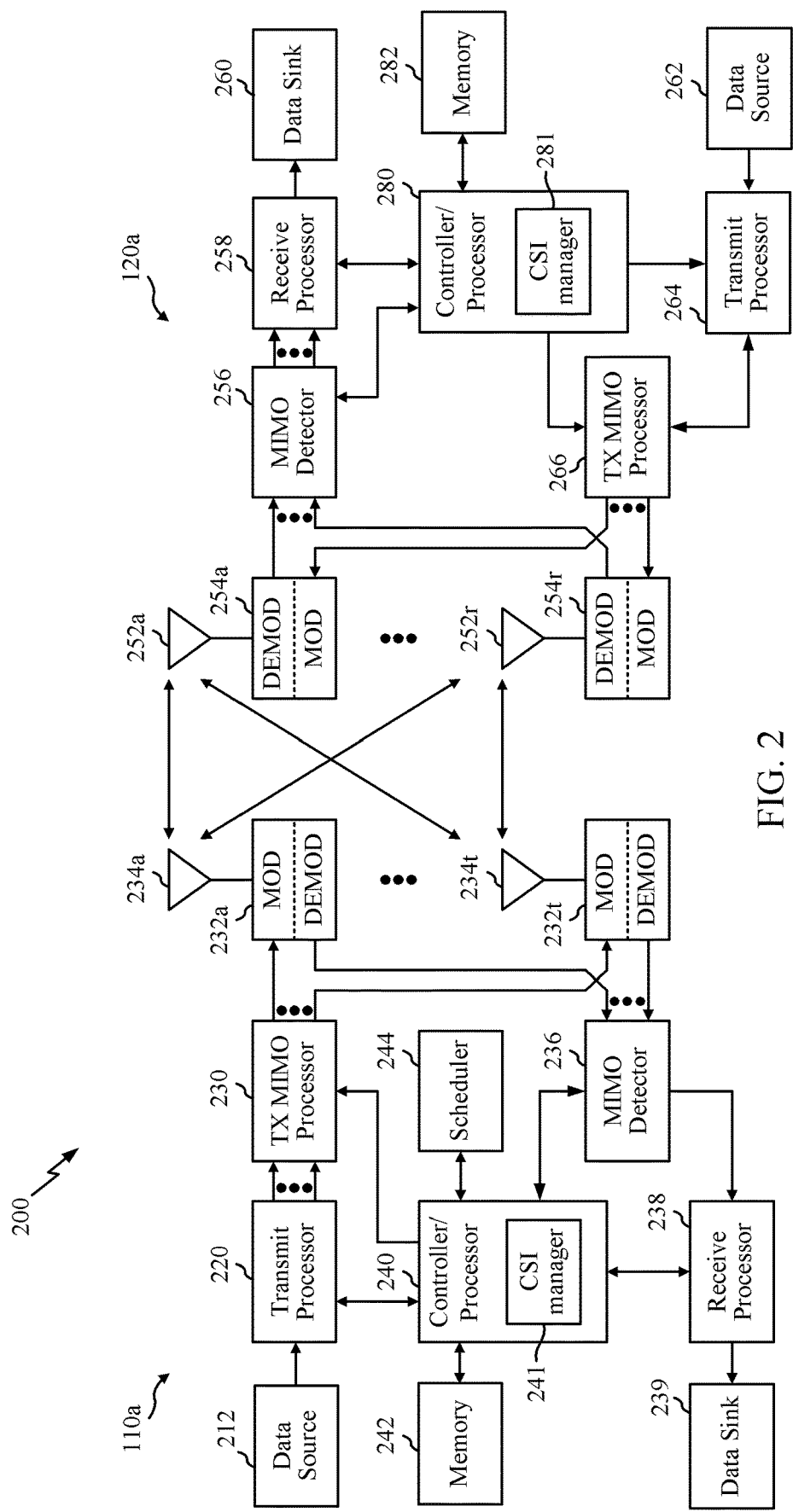
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, such as for the primary synchronization signal (PSS), secondary synchronization signal (SSS), and CSI-RS. A transmit (TX) MIMO processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal, such as for the sounding reference signal (SRS). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120a may direct the operation at the UE 120a. Antennas 234, processors 220, 230, 238, and/or the processor 240 at the BS 110a may perform or direct the operation at the BS 110a. The memories 242 and 282 may store data and program codes for BS 110a and UE 120a, respectively. A scheduler 244 may schedule UE 120a for data transmission on the downlink and/or uplink. As shown in FIG. 2, the controller/processor 280 of the UE 120a includes a CSI manager 281 and the controller/processor 240 of the BS 110a includes a CSI manager 241. The CSI manager 281 and the CSI manger 241 may be configured to perform the various techniques and methods described herein for CSI reporting for compressed CSI feedback for non-contiguous frequency resources.

Example CSI Report Configuration

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The network (e.g., a base station (BS)), may configure user equipment (UEs) for CSI reporting. For example, the BS configures the UE with a CSI report configuration or with multiple CSI report configurations. The CSI report configuration may be provided to the UE via higher layer signaling, such as radio resource control (RRC) signaling. The CSI report configuration may be associated with CSI-RS resources for channel measurement (CM), interference measurement (IM), or both. The CSI report configuration configures CSI-RS resources for measurement. The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

The CSI report configuration also configures the CSI parameters (sometimes referred to as quantities) to be reported. Three codebooks include Type I single panel, Type I multi-panel, and Type II single panel. Regardless which codebook is used, the CSI report may include a channel quality indicator (CQI), a precoding matrix indicator (PMI), a CSI-RS resource indicator (CRI), and/or a rank indicator (RI). The structure of the PMI may vary based on the codebook. The CRI, RI, and CQI may be in a first part (Part I) and the PMI may be in a second part (Part II) of the CSI report. For the Type I single panel codebook, the PMI may consist of a W1 matrix (e.g., subest of beams) and a W2 matrix (e.g., phase for cross polarization combination and beam selection). For the Type I multi-panel codebook, compared to type I single panel codebook, the PMI further comprises a phase for cross panel combination. For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state. The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource.

In certain systems (e.g., Release-15 NR systems), the user equipment (UE) is configured to report precoder matrix information (e.g., for the Type II CSI codebook) across subbands. The precoder matrix information may be compressed in the spatial domain (SD). For example, the UE can be configured to report the precoder $$w_r = \sum_{l=0}^{L-1} \begin{pmatrix} b_l \cdot c_{1,l} \\ b_l \cdot c_{2,l} \end{pmatrix},$$

where b is the selected beam, $c_{1,l}=[c_{1,l,0} \ldots c_{1,l,N_{SB}-1}]$ is the set of linear combination coefficients for a first polarization (e.g., +45) and $c_{2,l}=[c_{2,l,0} \ldots c_{2,l,N_{SB}-1}]$ is the set of linear combination coefficients for a second polarization (e.g., −45), L is the number of selected spatial beams, and $N_{SB}$ is the number of subbands configured for CSI reporting.

In certain systems (e.g., Release-16 NR systems), an enhanced linear combination codebook may be used, for example, for type II CSI reporting. The enhanced linear combination codebook may further configure compressed CSI feedback reporting in the frequency domain (FD). In some examples, the linear combination coefficients can be compressed in the frequency domain via a discrete Fourier transform (DFT)-based matrix (FD basis). Then, the UE reports the selected basis and coefficients to the base station (BS) after the compression. The BS can apply the coefficients to the selected basis to obtain the CSI feedback.

In some examples, for the FD compressed CSI feedback, the UE may be configured to report the precoder $$w_r = \sum_{l=0}^{L-1} \begin{pmatrix} b_l \cdot c_{1,l} \cdot F_{1,l}^H \\ b_l \cdot c_{2,l} \cdot F_{2,l}^H \end{pmatrix},$$

where $F_{1,l}^H=[f_{1,l,0} \ldots f_{1,l,M_{1,l}-1}]^H$ is the FD compression matrix (e.g., a DFT-basis of size $M_{1,l} \times N_3$) for the first polarization; $F_{2,l}^H=[f_{2,l,0} \ldots f_{2,l,M_{2,l}-1}]$ is the FD compression matrix (e.g., a DFT-basis of size $M_{2,l} \times N_3$) for the second polarization; $c_{1,l}=[c_{1,l,0} \ldots c_{1,l,M_{1,l}-1}]$ are the linear combination coefficients for the first polarization; $c_{2,l}=[c_{2,l,0} \ldots c_{2,l,M_{2,l}-1}]$ are the linear combination coefficients for the second polarization; $N_3$ is the frequency dimension of the precoder $w_r$; $M_{1,l}$ is the dimension of the compressed domain for the first polarization; and $M_{2,l}$ is the dimension of the compressed domain for the second polarization. $M_{1,l} < N_3$ and $M_{2,l} < N_3$. $M_{1,l}$ and $M_{2,l}$ may be the same or different.

The beam index and polarization index can be merged as $w_r = \sum_{i=0}^{2L-1} b_i c_i F_i^H$, where $c_i = [c_{i,0} \ldots c_{i,M_i-1}]$, $F_i^H = [f_{i,0} \ldots f_{i,M_i-1}]^H$ of size $M_i \times N_3$, and $$b_i = \begin{bmatrix} b_l \\ 0 \end{bmatrix} \text{ if } i \leq L-1$$

-continued and $$b_i = \begin{bmatrix} 0 \\ b_l \end{bmatrix}$$

if i>L−1 and l=i−L. In this case, the UE may be configured to report the spatial beam selection $b_0 \ldots b_{L-1}$, the FD compression basis selection $F_i^H=[f_{i,0} \ldots f_{iM_i-1}]^H$, and the coefficients $c_i$. In some examples, the UE only reports the FD compression basis common for all i spatial beams (e.g., $F_i=F$ and $M_i=M$, $\forall i=0, 1, \ldots, 2L-1$). In some examples, the UE reports only a subset of coefficients $K_0<K$ total coefficients, where $K=\Sigma_{i=0}^{2L-1}M_i$ if $F_i$ is beam-specific, or $K=2LM$ coefficients if $F_i$ is beam-common.

Figure 3:
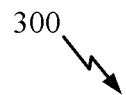
FIG. 3 is a table showing example subband sizes for different bandwidth part (BWP) sizes, in accordance with certain aspects of the present disclosure.
Figure 4:
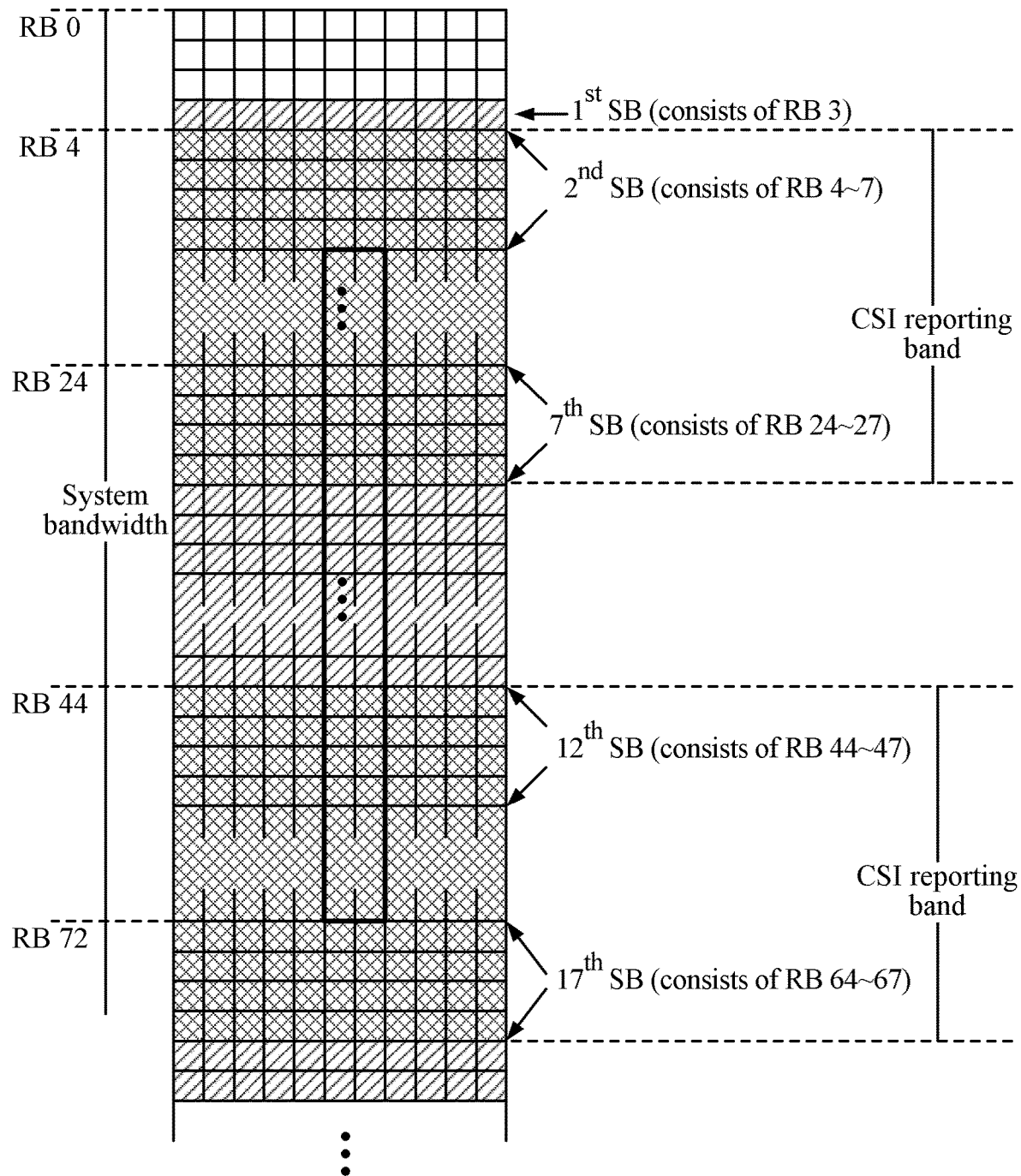
FIG. 4 is an example resource grid showing non-contiguous subbands configured for channel state information (CSI) reporting, in accordance with certain aspects of the present disclosure.

In some cases, the frequency resources (e.g., subbands or resource blocks (RBs)) configured for the CSI report may be non-contiguous. For example, the BS may configure the UE with frequency resources for CSI reporting. Different bandwidth parts (BWP) may be configured with different candidate subband sizes. Also, each BWP may be configured with multiple (e.g., two) candidate subband sizes. The table 300 in FIG. 3 shows example candidate subband sizes that may be configured for different BWPs. The BS can configure the subband sizes (e.g., 1 bit). The total number of subbands may be determined based on the BWP size and the subband size. In some examples, the BS may configure any combination of subbands (e.g., 3-19 subbands in the example shown in FIG. 3) for CSI reporting. The number of subbands for CSI reporting $N_{SB}$ may be determined by the BS and configured at the UE. Thus, as shown in FIG. 4, the configured subbands may be non-contiguous. In the example shown in FIG. 4, the subbands 2-7 and 12-17 are configured for CSI reporting.

FIG. 5 is an example nominal DFT-based matrix with oversampling $O_3$. The UE may select M basis out of the total $N_3 \times O_3$ basis. As shown in FIG. 5, the nominal DFT-based matrix has $N_3$ entries per row, corresponding to $N_3$ frequency components (e.g., RBs, multiple of RBs, or subbands); however, the nominal DFT-based matrix may not match with the non-contiguous frequency components. Thus, the nominal DFT-based matrix compression may lose its benefit in terms of overhead reduction or CSI accuracy. Therefore, techniques for frequency domain compressed CSI reporting (e.g., using the enhanced linear combination codebook) with a non-contiguous frequency resource set configuration are desired.

Example Compressed CSI Feedback for Non-Contiguous Frequency Resources

Aspects of the present disclosure provide techniques and apparatus for compressed channel state information (CSI) feedback with a non-contiguous frequency resource set configuration. In some examples, the user equipment (UE) performs the frequency domain (FD) compression using a truncated nominal discrete Fourier transform (DFT) based matrix. For example, based on the frequency resource configuration, columns or rows of the nominal DFT-based matrix can be removed. In some examples, the UE performs separate FD compression for contiguous subbands. That is, for each segment of contiguous subbands, the UE perform an individual FD compression.

Figure 6:
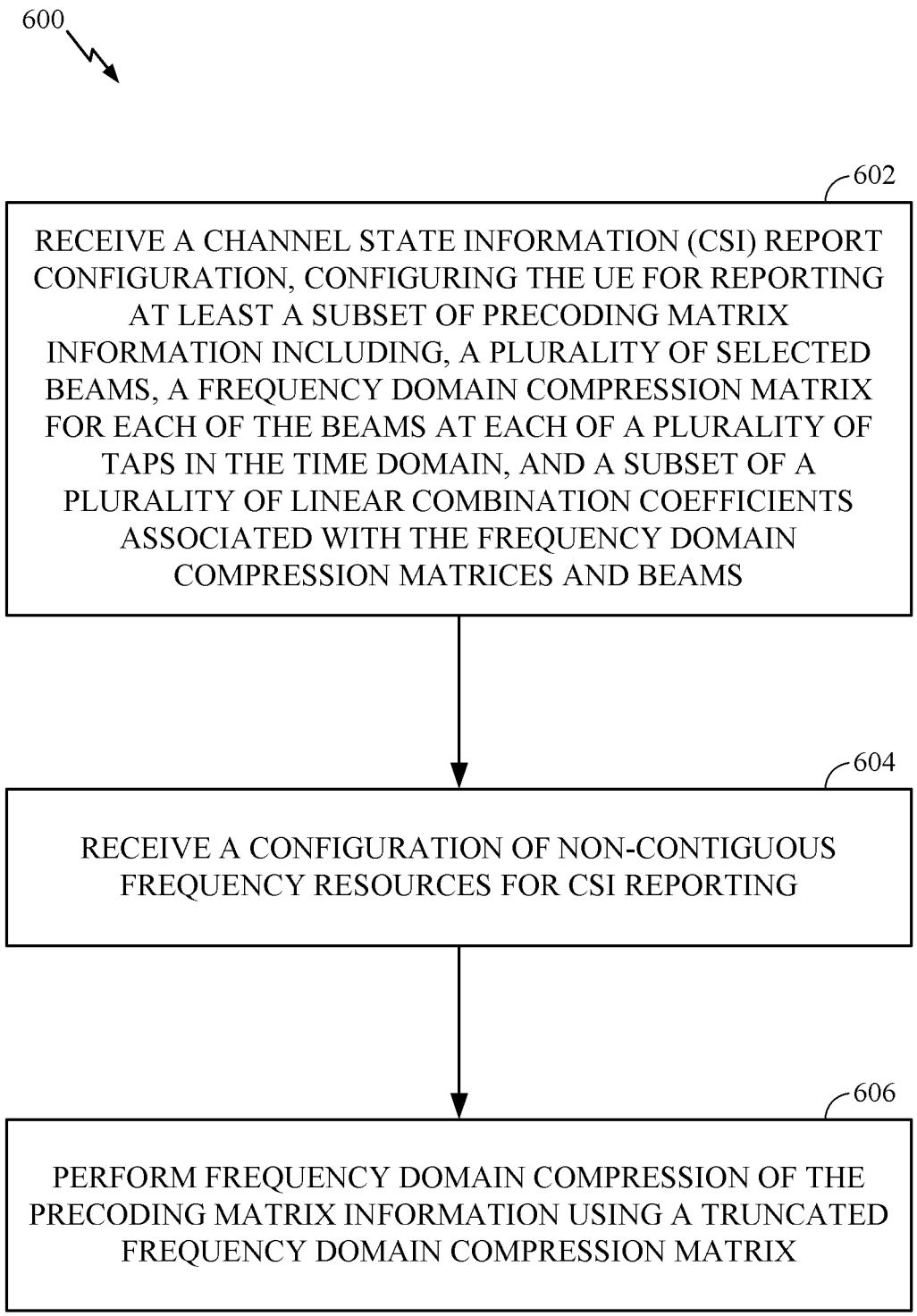
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., such as the UE 120a in the wireless communication network 100) for CSI compression using a truncated matrix when non-contiguous frequency resource are configured for CSI reporting. Operations 600 may be implemented as software components that are executed and run on one or more processors (e.g., processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 600 may begin, at 602, by receiving a CSI report configuration. The CSI report configuration configures the UE for reporting at least a subset of precoding matrix information. For example, the UE may be configured to report a plurality of selected beams (L), a frequency domain compression matrix (F) for each of the beams at each of a plurality of taps (M) in the time domain, and a subset of a plurality of linear combination coefficients associated with the FD compression matrices and beams.

At 604, the UE receives a configuration of non-contiguous frequency resources for CSI reporting. In some example, the configuration of non-contiguous frequency resources (e.g., subbands, resource blocks (RBs), or multiples of RBs) is configured as part of the CSI report configuration. The UE can determine the number of configured frequency resources based on a starting and ending frequency resource index.

At 606, the UE performs frequency domain compression of the precoding matrix information using a truncated frequency domain compression matrix. In some examples, the UE compresses the linear combination coefficients using a truncated nominal DFT-based matrix. The truncation may be based on the frequency resource configuration. The UE may determine a nominal DFT-based matrix with a size equal to at least the number of configured frequency resources $N_3$. The number of configured frequency resources is determined by the starting resource index and the ending resource index. In some example, the DFT-based matrix is an inverse DFT (iDFT) based matrix. The UE truncates the determined nominal DFT-based matrix based on a subband size configuration. According to certain aspects, truncating the nominal DFT-based matrix includes removing columns (e.g., removing the entry in each row) or rows of the nominal DFT-base matrix when the corresponding frequency resource is not configured for CSI reporting, as shown in the example truncated matrix in FIG. 7.

The UE may calculate precoding matrix indicator (PMI), channel quality indicator (CQI), and/or rank indicator (RI) based on the truncated nominal DFT-based matrix. For example, the UE reports M truncated basis and the corresponding subset of coefficients.

According to certain aspects, the UE can determine the compression algorithm using a sparse coefficient matrix that provides good performance.

Figure 8:
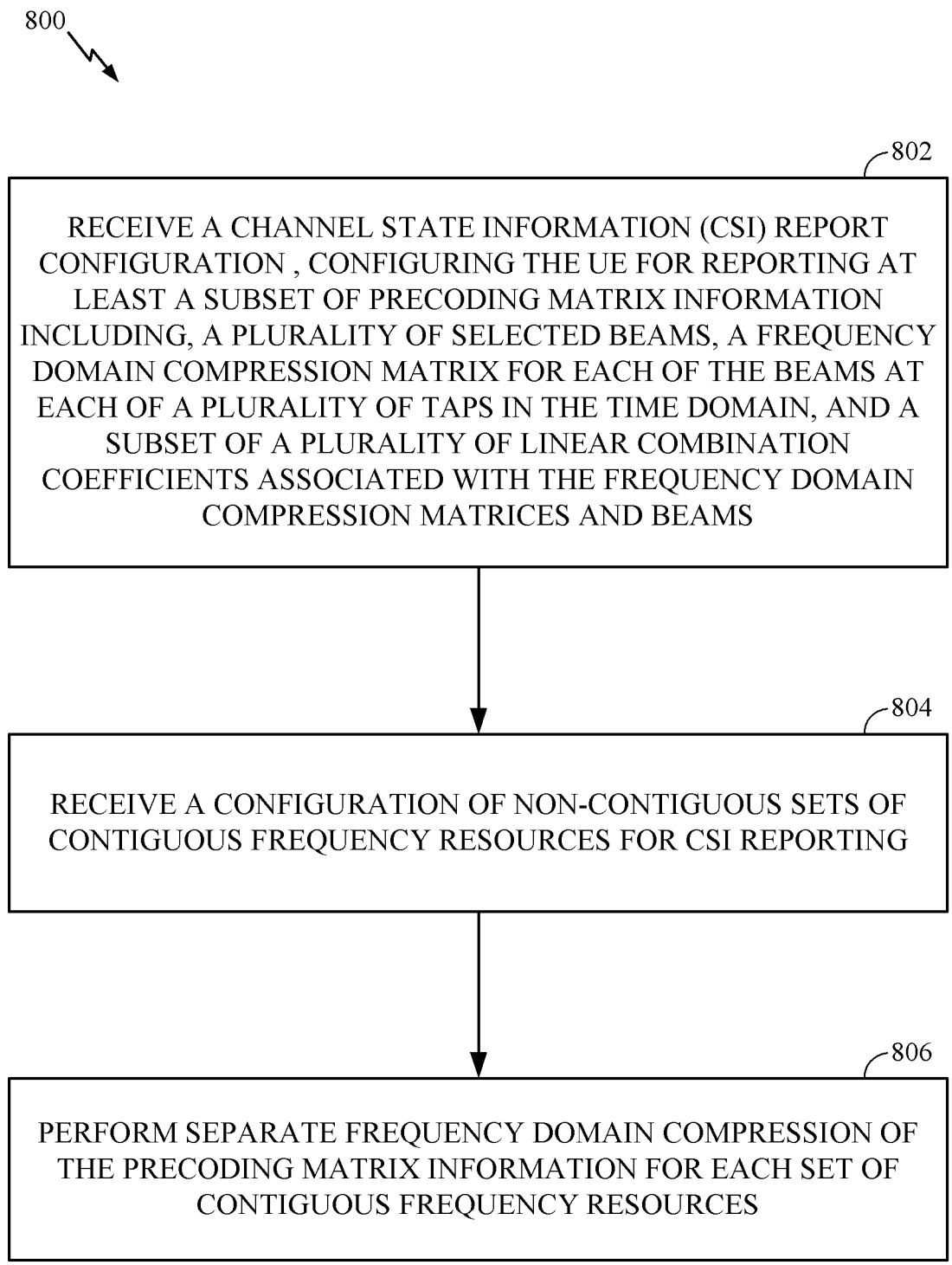
FIG. 8 is a flow diagram illustrating example operations for wireless communication by a UE, in accordance with certain aspects of the present disclosure.

FIG. 8 is a flow diagram illustrating example operations 800 for wireless communication, in accordance with certain aspects of the present disclosure. The operations 800 may be performed, for example, by UE (e.g., such as a UE 120a in the wireless communication network 100) for compressed CSI reporting using separate FD compression for non-contiguous sets of contiguous frequency resources. Operations 800 may be implemented as software components that are executed and run on one or more processors (e.g., processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 800 may begin, at 802, by receiving a CSI report configuration, configuring the UE for reporting at least a subset of precoding matrix information including, a plurality of selected beams, a FD compression matrix for each of the beams at each of a plurality of taps in the time domain, and a subset of a plurality of linear combination coefficients associated with the FD compression matrices and beams.

At 804, the UE receives a configuration of non-contiguous sets of contiguous frequency resources for CSI reporting.

At 806, the UE performs separate FD compression of the precoding matrix information for each set of contiguous frequency resources. According to certain aspects, a set of contiguous frequency resources may refer to a set of evenly spaced frequency resources. The UE can determine, for each set of contiguous frequency resources, the number of frequency resources in the set. In some examples, the UE determines a nominal DFT-based matrix, having a size equal to the determined number of frequency resources in the set, for performing the frequency compression of the set. For example, for each segment n of contiguous resources, the UE determines a nominal DFT-based matrix of size $N_{3,n}$. For example, referring back to the FIG. 4, the UE may perform FD compression of the CSI feedback for the configured subbands 4-7 and the UE may perform another separate FD compression of the CSI feedback for the configured subbands 12-17.

As discussed above, the UE reports the FD compression basis used for the FD compression. FIG. 9 illustrates example FD compression basis reporting for non-contiguous subbands, in accordance with certain aspects of the present disclosure. In some example, in each segment, basis selection is common for all beams. In some examples, the UE may report $M_n$ basis per segment n. In this case, the value of $M_n$ may be selected based on $N_{3,n}$. For example, for $\lceil \log_2 \binom{N_{3,n}}{M_n} \rceil$ bits may be used for segment n and $\Sigma_{n=0}^{J} \lceil \log_2 \binom{N_{3,n}}{M_n} \rceil$ total bits may be used. In some examples, the UE may report any M total basis across all segments. In this case, the value of M may be based on $N_3 = \Sigma_{n=0} N_{3,n}$ and $\lceil \log_2 \binom{N_3}{M} \rceil$ total bits may be used. Thus, in some examples, for a first set of the contiguous frequency resources, the UE may report a first subset of FD compression matrix basis, where the number of the first subset of basis is determined based at least in part on the number of frequency resources in the first set. And for a second set of the contiguous frequency resources, the UE may report a second subset of FD compression matrix basis, where the number of the second subset of basis is determined based at least in part on the number of frequency resources in the second set. In some examples, the UE may report a subset of FD compression matrix basis across all of the sets, where the number of basis in the subset is based at least in part on the total number of frequency resources across all sets. In some cases, the basis selection is beam-specific. That is, for a beam i, in segment n, the UE selects and reports $M_{i,n}$ basis out of the $N_{3,n}$ total basis; or, for a beam i, the UE selects and reports $M_i$ out of the $N_3$ total basis.

In some examples, the UE may report $K_{0,n} < 2LM_n$ coefficients for each segment n, or $k_{0,n} < \Sigma_{i=n}^{2L-1} M_{i,n}$ coefficients for each segment n for the case with beam-specific basis selection. The value of $K_{0,n}$ is based on $M_n$ (or $\Sigma_{i=0}^{2L-1} M_{i,n}$) and $K_0 = \Sigma_{n=0}^{J} K_{0,n}$ total coefficients are reported. In some examples, the UE reports any $K_0 < 2LM$ coefficients across all the segments or $K_0 < \Sigma_{i=0}^{2L-1} M_i$ coefficients across all the segments for the case with beam-specific basis selection. Thus, in some examples, for the first subset of FD compression matrix basis, the UE may report a first subset of coefficients and for the second subset of FD compression matrix basis reporting a second subset of coefficients. In some examples, the UE may report a subset of coefficients for the subset of FD compression matrix basis across all of the sets.

According to certain aspects, the number of reported FD compression basis and/or the number of reported coefficients may be configured by the BS or determined and reported by the UE.

According to certain aspects, the UE may determine whether to perform the FD compression using a truncated matrix or to perform separate FD compression for contiguous sets of frequency resources. For example, the UE may determine the compression technique to apply based on a size of the gap between non-contiguous resources. In some examples, if the gap between configured frequency resource is equal to or smaller than a threshold size (e.g., two subbands), then the UE may perform 'normal' FD compression using the nominal DFT-based matrix having a size based on the starting and index subband/RB index. If the gap is larger than the threshold, then the UE may perform FD compression using the truncated matrix or the separate FD compression for contiguous sets of frequency resources. In some examples, when the gap is larger than the threshold, then the UE may perform FD compression using the truncated matrix if the gap is equal to or smaller than a second threshold and the UE may perform the FD compression separately for contiguous sets of frequency resources if the gap is larger than the second threshold.

In some examples, if the total number of configured frequency resource (subbands or RBs) and/or the number of frequency resource in a contiguous segment is smaller than a threshold (e.g., fewer than four subbands/RBs), the UE does not perform (e.g., skips) FD compression for the CSI report, or does not perform FD compression for that segment. In this case, the UE may report the uncompressed CSI (e.g., with no basis report, and reports all coefficients per subband) or the UE may treat it as an error case.

According to certain aspects, the BS does not configure, and the UE does not expect to be configured, with non-contiguous frequency resources for CSI reporting.

The BS may perform complementary operations to the operations described above for the UE. For example, the BS may configure the UE with the CSI report configuration and with the frequency resource configuration including non-contiguous frequency resources. The BS may receive compressed CSI feedback from the UE, including the selected beams and the corresponding frequency compression basis and subset of coefficients. The BS can perform frequency decompression of the feedback received from the UE to obtain precoding matrix information. The BS can perform the frequency decompression using the truncated DFT-based matrix and/or the BS can perform separate frequency decompression of sets of contiguous resources.

Figure 10:
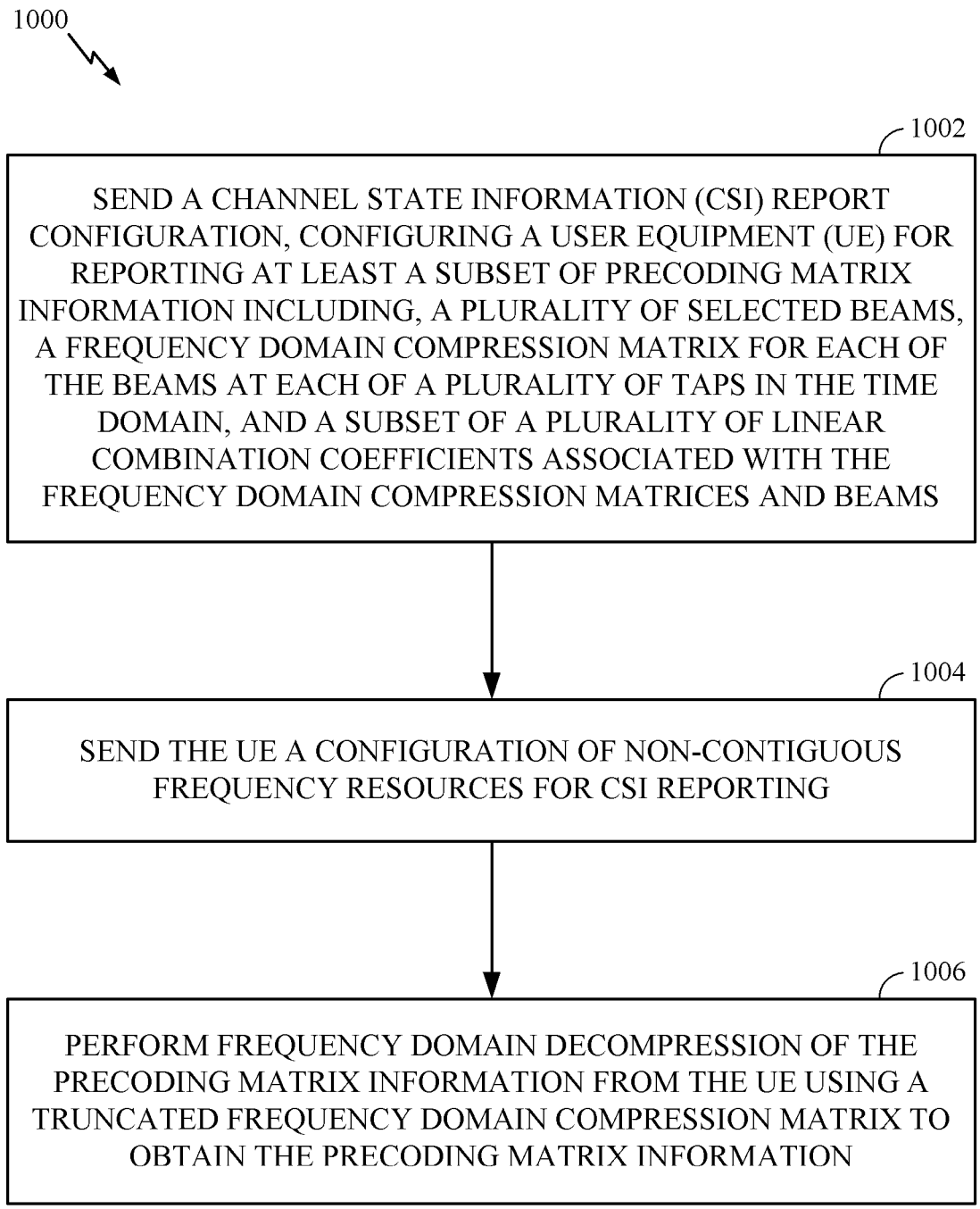
FIG. 10 is a flow diagram illustrating example operations for wireless communication by a BS, in accordance with certain aspects of the present disclosure.

FIG. 10 is a flow diagram illustrating example operations 1000 for wireless communication, in accordance with certain aspects of the present disclosure. The operations 1000 may be performed, for example, by a BS (e.g., such as the BS 110a in the wireless communication network 100). The operations 1000 may be complimentary operations by the BS to the operations 600 performed by the UE. Operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at 1002, by sending a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams.

At 1004, the BS sends the UE a configuration of non-contiguous frequency resources for CSI reporting.

At 1006, the BS performs frequency domain decompression of the precoding matrix information from the UE using a truncated frequency domain compression matrix to obtain the precoding matrix information.

Figure 11:
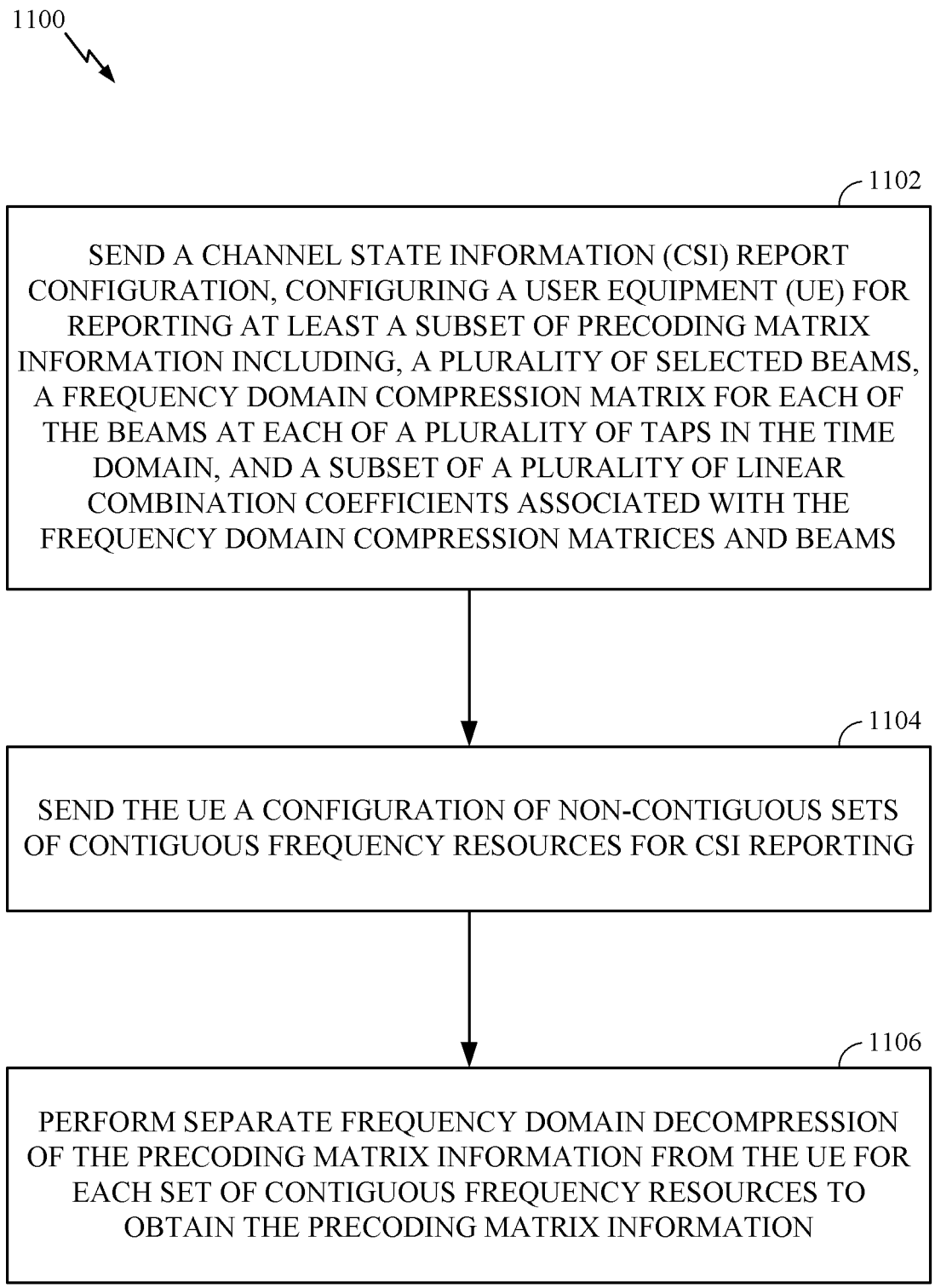
FIG. 11 is a flow diagram illustrating example operations for wireless communication by a BS, in accordance with certain aspects of the present disclosure.

FIG. 11 is a flow diagram illustrating example operations 1100 for wireless communication, in accordance with certain aspects of the present disclosure. The operations 1100 may be performed, for example, by a BS (e.g., such as the BS 110a in the wireless communication network 100). The operations 1100 may be complimentary operations by the BS to the operations 800 performed by the UE. Operations 1100 may be implemented as software components that are executed and run on one or more processors (e.g., controller/processor 240 of FIG. 2). Further, the transmission and reception of signals by the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1100 may begin, at 1102, by sending a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams.

At 1104, the BS sends the UE a configuration of non-contiguous sets of contiguous frequency resources for CSI reporting.

Figure 12:
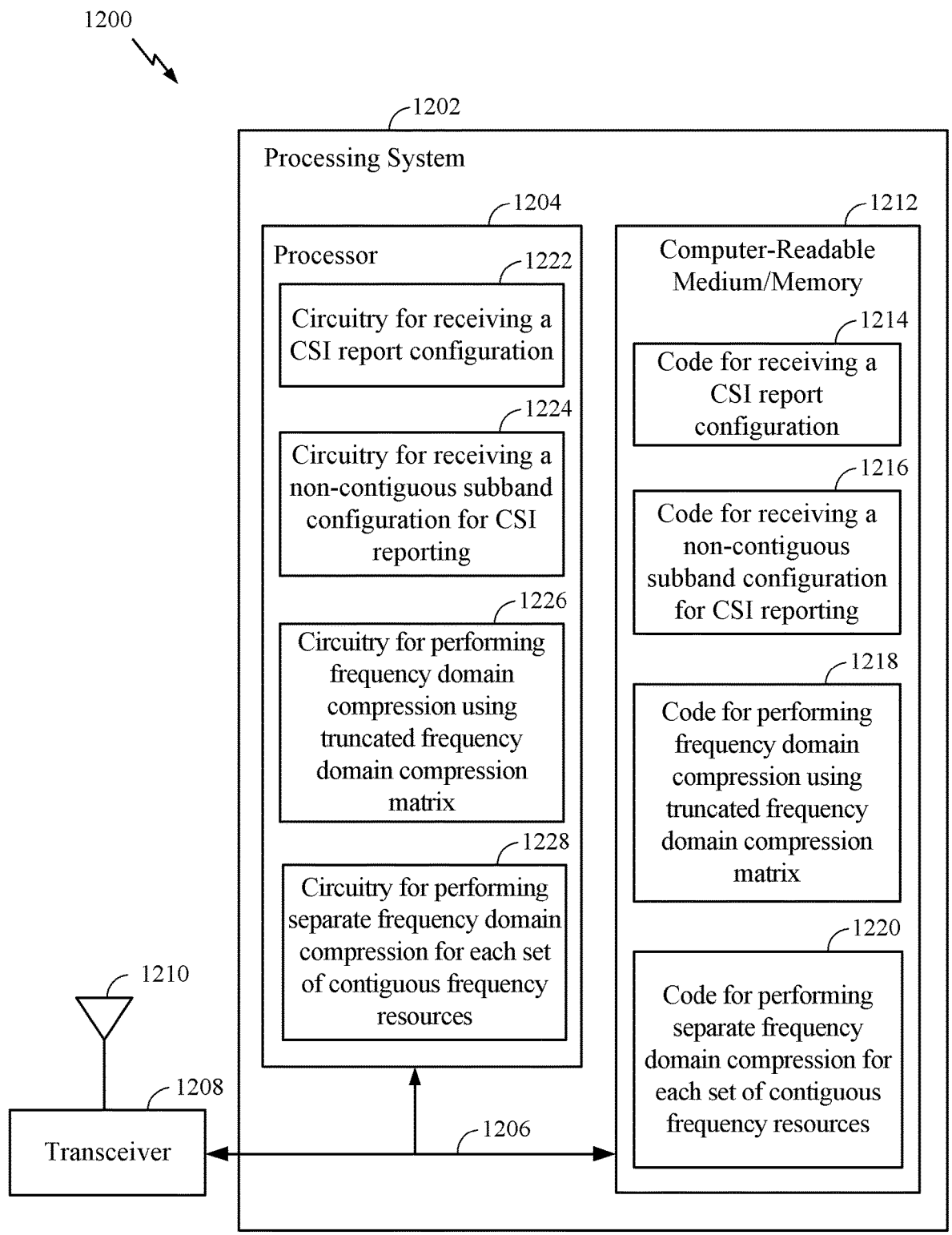
FIG. 12 illustrates a communications device that may include various components configured to perform operations for the techniques disclosed herein in accordance with aspects of the present disclosure.

At 1106, the BS performs separate frequency domain decompression of the precoding matrix information from the UE for each set of contiguous frequency resources to obtain the precoding matrix information FIG. 12 illustrates a communications device 1200 that may include various components (e.g., corresponding to means-plus-function components) configured to perform operations for the techniques disclosed herein, such as the operations illustrated in FIG. 6 and/or FIG. 8. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 6 and/or FIG. 8, or other operations for performing the various techniques discussed herein for basis reporting for enhanced linear combination codebook with non-contiguous subbands. In certain aspects, computer-readable medium/memory 1212 stores code 1214 for receiving a CSI report configuration; code 1216 for receiving a configuration of non-contiguous frequency resources for CSI reporting; code 1218 for performing frequency domain compression of the precoding matrix information using a truncated frequency domain compression matrix; and/or code 1220 for performing separate frequency domain compression of the precoding matrix information for each set of contiguous frequency resources. In certain aspects, the processor 1204 has circuitry configured to implement the code stored in the computer-readable medium/memory 1212. The processor 1204 includes circuitry 1222 for receiving a CSI report configuration; circuitry 1224 for receiving a configuration of non-contiguous frequency resources for CSI reporting; circuitry 1226 for performing frequency domain compression of the precoding matrix information using a truncated frequency domain compression matrix; and/or circuitry 1228 for performing separate frequency domain compression of the precoding matrix information for each set of contiguous frequency resources.

Figure 13:
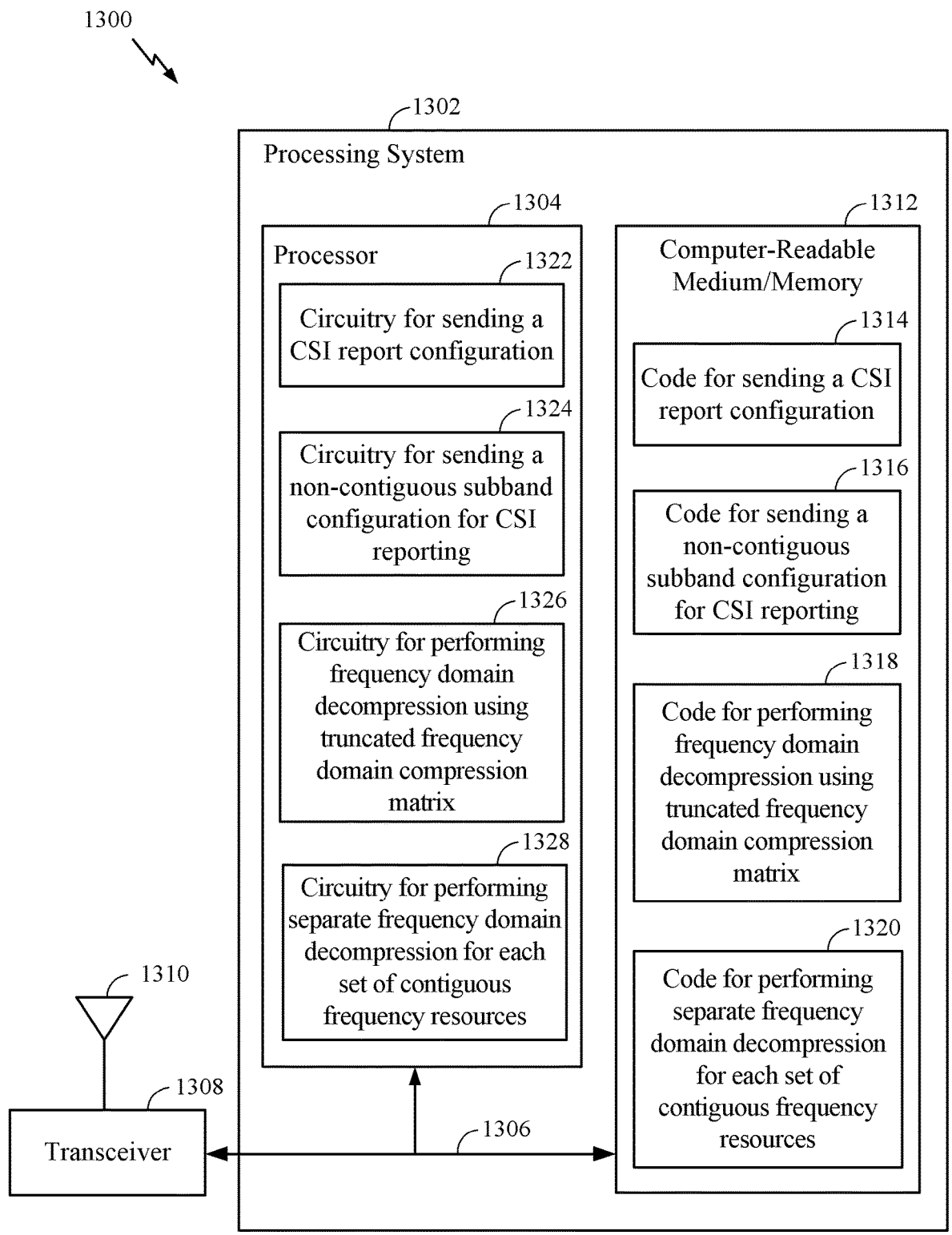
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 10 and/or FIG. 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9 and/or FIG. 11, or other operations for performing the various techniques discussed herein for basis reporting for enhanced linear combination codebook with non-contiguous subbands. In certain aspects, computer-readable medium/memory 1312 stores code 1314 for sending a CSI report configuration; code 1316 for sending a configuration of non-contiguous frequency resources for CSI reporting; code 1318 for performing frequency domain decompression of the precoding matrix information using a truncated frequency domain compression matrix; and/or code 1320 for performing separate frequency domain decompression of the precoding matrix information for each set of contiguous frequency resources. In certain aspects, the processor 1304 has circuitry configured to implement the code stored in the computer-readable medium/memory 1312. The processor 1304 includes circuitry 1322 for sending a CSI report configuration; circuitry 1324 for sending a configuration of non-contiguous frequency resources for CSI reporting; circuitry 1326 for performing frequency domain decompression of the precoding matrix information using a truncated frequency domain compression matrix; and/or circuitry 1328 for performing separate frequency domain decompression of the precoding matrix information for each set of contiguous frequency resources.

Example Aspects

According to a first aspect, a method for wireless communication by a user equipment (UE), includes receiving a channel state information (CSI) report configuration. The CSI report configuration configures the UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The UE receives a configuration of non-contiguous frequency resources for CSI reporting; and performs frequency domain compression of the precoding matrix information using a truncated frequency domain compression matrix.

According to a second aspect, in combination with the first aspect, the UE determines the number of configured frequency resources based on a starting and ending frequency resource index.

According to a third aspect, in combination with one or more of the first and second aspects, the UE reports the frequency domain basis. The number of frequency domain basis is based on the number of the configured frequency resources.

According to a fourth aspect, in combination with one or more of the first through third aspects, performing frequency domain compression of the precoding matrix information includes compressing the linear combination coefficients using a truncated nominal discrete Fourier transform (DFT)-based matrix.

According to a fifth aspect, in combination with one or more of the first through fourth aspects, performing frequency domain compression of the precoding matrix information includes determining the nominal DFT-based matrix with a size equal to at least the number of configured frequency resources; truncating the determined nominal DFT-based matrix based on a subband size configuration; and calculating at least one of: precoding matrix indicator (PMI), channel quality indicator (CQI), or rank indicator (RI) based on the truncated nominal DFT-based matrix.

According to a sixth aspect, in combination with one or more of the first through fifth aspects, truncating the nominal DFT-based matrix includes removing columns or rows of the nominal DFT-base matrix when the corresponding frequency resource is not configured for CSI reporting.

According to a seventh aspect, in combination with one or more of the first through sixth aspects, the UE determines a size of a gap between sets of non-contiguous frequency resources; performs frequency compression of the precoding matrix information using the nominal DFT-based matrix when the size of the gap is below a threshold; and performs frequency compression of the precoding matrix information using the truncated frequency domain compression matrix when the size of the gap is equal to greater than the threshold.

According to an eighth aspect, in combination with one or more of the first through seventh aspects, the UE skips frequency domain compression of the precoding matrix information when the number of configured frequency resources is smaller than a threshold.

According to a ninth aspect, a method for wireless communication by a user equipment (UE), includes receiving a channel state information (CSI) report configuration. The CSI report configuration configures the UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The UE receives a configuration of non-contiguous sets of contiguous frequency resources for CSI reporting; and performs separate frequency domain compression of the precoding matrix information for each set of contiguous frequency resources.

According to a tenth aspect, in combination with the ninth aspect, performing separate frequency domain compression of the precoding matrix information for each set of contiguous frequency resources includes determining, for each set of contiguous frequency resources, the number of frequency resources in the set; and determining a nominal discrete Fourier transform (DFT)-based matrix, having a size equal to the determined number of frequency resources in the set, for performing the frequency domain compression of the set.

According to an eleventh aspect, in combination with one or more of the ninth and tenth aspects, the UE, for a first set of the contiguous frequency resources, reports a first subset of frequency domain compression matrix basis. The number of the first subset of basis is determined based at least in part on the number of frequency resources in the first set. The UE, for a second set of the contiguous frequency resources, reports a second subset of frequency domain compression matrix basis. The number of the second subset of basis is determined based at least in part on the number of frequency resources in the second set.

According to a twelfth aspect, in combination with one or more of the ninth through eleventh aspects, the UE, for the first subset of frequency domain compression matrix basis, reports a first subset of linear combination coefficients; and for the second subset of frequency domain compression matrix basis, reports a second subset of linear combination coefficients.

According to a thirteenth aspect, in combination with one or more of the ninth through twelfth aspects, the UE reports a subset of linear combination coefficients for the subset of frequency compression matrix basis across all of the sets.

According to a fourteenth aspect, in combination with one or more of the ninth through thirteenth aspects, the UE reports a subset of frequency domain compression matrix basis across all of the sets. The number of basis in the subset is based at least in part on the total number of frequency resources across all sets.

According to a fifteenth aspect, in combination with one or more of the ninth through eleventh aspects, the UE determines a size of a gap between sets of non-contiguous frequency resources; performs joint frequency compression of the precoding matrix information for the sets of non-contiguous frequency resources using the nominal DFT-based matrix when the size of the gap is below a threshold; and performs the separate frequency compression of the precoding matrix information for the sets of non-contiguous frequency resources when the size of the gap is equal to or greater than the threshold.

According to a sixteenth aspect, in combination with one or more of the ninth through fifteenth aspects, the contiguous resources include evenly spaced resources.

According to a seventeenth aspect, in combination with one or more of the ninth through sixteenth aspects, the UE skips frequency domain compression of the precoding matrix information when the number of configured frequency resources is smaller than a threshold.

According to an eighteenth aspect, a method for wireless communication by a base station (BS) includes sending a channel state information (CSI) report configuration. The CSI report configuration configures a user equipment (UE) for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The BS sends the UE a configuration of non-contiguous frequency resources for CSI reporting; and performs frequency domain decompression of the precoding matrix information from the UE using a truncated frequency domain compression matrix to obtain the precoding matrix information.

According to a nineteenth aspect, in combination with the eighteenth aspect, performing frequency domain compression of the precoding matrix information includes compressing the linear combination coefficients using a truncated nominal discrete Fourier transform (DFT)-based matrix. The nominal DFT-based matrix has a size equal to at least the number of configured frequency resources and the nominal DFT-based matrix is truncated based on a subband size configuration.

According to a twentieth aspect, in combination with one or more of the eighteenth and nineteenth aspects, the BS receives an indication from the UE reporting the truncated nominal DFT-based matrix used for the frequency domain compression.

According to a twenty-first aspect, in combination with one or more of the eighteenth through twentieth aspects, the BS determines the number of configured frequency resources based on a starting and ending subband or resource block (RB) index.

According to a twenty-second aspect, in combination with one or more of the eighteenth through twenty-first aspects, the truncated nominal DFT-based matrix includes removed columns or rows of the nominal DFT-base matrix when the corresponding frequency resource is not configured for CSI reporting.

According to a twenty-third aspect, a method for wireless communication by a base station (BS) includes sending a channel state information (CSI) report configuration. The CSI report configuration configures a user equipment (UE) for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The BS sends the UE a configuration of non-contiguous sets of contiguous frequency resources for CSI reporting; and performs separate frequency domain decompression of the precoding matrix information from the UE for each set of contiguous frequency resources to obtain the precoding matrix information.

According to a twenty-fourth aspect, in combination with the twenty-third aspect, the BS receives an indication from the UE of a nominal discrete Fourier transform (DFT)-based matrix used for the frequency domain compression.

According to a twenty-fifth aspect, in combination with one or more of the twenty-third and twenty-fourth aspects, the BS receives a report from the UE, for a first set of the contiguous frequency resources, reporting a first subset of frequency domain compression matrix basis. The number of the first subset of basis is determined based at least in part on the number of frequency resources in the first set. The BS receives a report from the UE, for a second set of the contiguous frequency resources, reporting a second subset of frequency domain compression matrix basis. The number of the second subset of basis is determined based at least in part on the number of frequency resources in the second set.

According to a twenty-sixth aspect, in combination with one or more of the twenty-third through twenty-fifth aspects, the BS receives a report from the UE reporting a subset of frequency domain compression matrix basis across all of the sets. The number of basis in the subset is based at least in part on the total number of frequency resources across all sets.

According to a twenty-seventh aspect, in combination with one or more of the twenty-third through twenty-sixth aspects, the BS receives a report from the UE, for the first subset of frequency domain compression matrix basis, reporting a first subset of coefficients; and receives a report from the UE, for the second subset of frequency domain compression matrix basis, reporting a second subset of coefficients.

According to a twenty-eighth aspect, in combination with one or more of the twenty-third through twenty-seventh aspects, the BS receives a report from the UE reporting a subset of coefficients for the subset of frequency compression matrix basis across all of the sets.

According to a twenty-ninth aspect, in combination with one or more of the twenty-third through twenty-eighth aspects, the contiguous resources comprise evenly spaced resources.

According to a thirtieth aspect, in combination with one or more of the twenty-third through twenty-ninth aspects, the BS determines a size of a gap between sets of non-contiguous frequency resources; performs joint frequency decompression of the precoding matrix information for the sets of non-contiguous frequency resources using the nominal DFT-based matrix when the size of the gap is below a threshold; and performs the separate frequency decompression of the precoding matrix information for the sets of non-contiguous frequency resources when the size of the gap is equal to or greater than the threshold.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 6, 8, 10 and/or 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), the method comprising:
receiving a channel state information (CSI) report configuration configuring the UE for reporting at least a subset of precoding matrix information including a plurality of selected beams, a frequency domain compression matrix for each of the plurality of beams at each of a plurality of taps in the time domain, and a subset of a plurality of linear combination coefficients associated with the frequency domain compression matrices and the plurality of beams;
receiving a configuration of non-contiguous sets of contiguous frequency resources for CSI reporting; and
performing separate frequency domain compression of the precoding matrix information for each set of the non-contiguous sets of contiguous frequency resources, wherein performing separate frequency domain compression of the precoding matrix information for each set of the non-contiguous sets of contiguous frequency resources comprises, for each set of contiguous frequency resources:

determining a total number of frequency resources in the set of contiguous frequency resources;

determining a nominal discrete Fourier transform (DFT)-based matrix having a size equal to the determined total number of frequency resources in the set of contiguous frequency resources; and performing the frequency domain compression of the set of contiguous frequency resources using the nominal DFT-based matrix.

2. The method of claim 1, further comprising:

reporting, for a first set of the non-contiguous sets of contiguous frequency resources, a first subset of frequency domain compression matrix basis, wherein a total number of the first subset of frequency domain compression basis is determined based at least in part on the total number of frequency resources in the first set of contiguous resources; and reporting, for a second set of the non-contiguous sets of contiguous frequency resources, a second subset of frequency domain compression matrix basis, wherein a total number of the second subset of frequency domain compression basis is determined based at least in part on the total number of frequency resources in the second set of contiguous resources.

3. The method of claim 2, further comprising:

reporting, for the first subset of frequency domain compression matrix basis, a first subset of linear combination coefficients; and reporting, for the second subset of frequency domain compression matrix basis, a second subset of linear combination coefficients.

4. The method of claim 2, further comprising reporting a subset of linear combination coefficients for the first and second subsets of frequency compression matrix basis across all of the non-contiguous sets of contiguous frequency resources.

5. The method of claim 1, further comprising reporting a subset of frequency domain compression matrix basis across all of the non-contiguous sets of contiguous frequency resources, wherein a total number of frequency domain compression matrix basis in the subset of frequency domain compression matrix basis is based at least in part on the total number of frequency resources across all the non-contiguous sets of contiguous frequency resources.

6. The method of claim 1, further comprising determining a size of a gap between the non-contiguous sets of contiguous frequency resources, wherein performing the separate frequency domain compression of the precoding matrix information for the non-contiguous sets of contiguous frequency resources is in response to determining the size of the gap is equal to or greater than a threshold.

7. The method of claim 1, wherein the non-contiguous sets of contiguous frequency resources comprise evenly spaced frequency resources.

8. The method of claim 1, further comprising skipping frequency domain compression of precoding matrix information when the number of configured frequency resources is smaller than a threshold.

9. A method for wireless communication by a base station (BS), the method comprising:

sending a channel state information (CSI) report configuration configuring a user equipment (UE) for reporting at least a subset of precoding matrix information including a plurality of selected beams, a frequency domain compression matrix for each of the plurality of beams at each of a plurality of taps in the time domain, and a subset of a plurality of linear combination coefficients associated with the frequency domain compression matrices and the plurality of beams;

sending the UE a configuration of non-contiguous sets of contiguous frequency resources for CSI reporting;

receiving an indication from the UE of a nominal discrete Fourier transform (DFT)-based matrix used for frequency domain compression at the UE; and performing separate frequency domain decompression of the precoding matrix information from the UE, based on the nominal DFT-based matrix, for each set of the non-contiguous sets of contiguous frequency resources to obtain the precoding matrix information.

10. The method of claim 9, further comprising:

receiving a first report from the UE for a first set of the contiguous frequency resources, the first report reporting a first subset of frequency domain compression matrix basis, wherein a total number of the first subset of frequency domain compression matrix basis is based at least in part on the total number of frequency resources in the first set of the contiguous frequency resources; and receiving a second report from the UE, for a second set of the contiguous frequency resources, the second report reporting a second subset of frequency domain compression matrix basis, wherein a total number of the second subset of frequency domain compression matrix basis is based at least in part on the total number of frequency resources in the second set of the contiguous frequency resources.

11. The method of claim 10, further comprising receiving a report from the UE reporting a subset of frequency domain compression matrix basis across all of the non-contiguous sets of contiguous frequency resources, wherein a total number of frequency domain compression matrix basis in the subset of frequency domain compression matrix is based at least in part on the total number of frequency resources across all the non-contiguous sets of contiguous frequency resources.

12. The method of claim 10, further comprising:

receiving a first report from the UE for the first subset of frequency domain compression matrix basis, the first report reporting a first subset of linear combination coefficients; and receiving a second report from the UE for the second subset of frequency domain compression matrix basis, the second report reporting a second subset of linear combination coefficients.

13. The method of claim 10, further comprising receiving a report from the UE reporting a subset of linear combination coefficients for the subset of frequency domain compression matrix basis across all of the non-contiguous sets of contiguous frequency resources.

14. The method of claim 9, wherein the non-contiguous sets of contiguous frequency resources comprise evenly spaced frequency resources.

15. The method of claim 9, further comprising determining a size of a gap between the non-contiguous sets of contiguous frequency resources, wherein performing the separate frequency decompression of the precoding matrix information for the non-contiguous sets of contiguous frequency resources is in response to determining the size of the gap is equal to or greater than a threshold.

16. A user equipment (UE) comprising:

memory storing computer executable code thereon; and one or more processors coupled with the memory and configured to execute the computer executable code and cause the user equipment to:

receive a channel state information (CSI) report configuration configuring the UE for reporting at least a subset of precoding matrix information including a plurality of selected beams, a frequency domain compression matrix for each of the plurality of beams at each of a plurality of taps in the time domain, and a subset of a plurality of linear combination coefficients associated with the frequency domain compression matrices and the plurality of beams;

receive a configuration of non-contiguous sets of contiguous frequency resources for CSI reporting;

determine a size of a gap between the non-contiguous sets of contiguous frequency resources; and perform separate frequency domain compression of the precoding matrix information for each set of the non-contiguous sets of contiguous frequency resources in response to determining the size of the gap is equal to or greater than a threshold.

17. The user equipment of claim 16, wherein the one or more processors are configured to cause the user equipment to:

determine a total number of frequency resources in the set of contiguous frequency resources;

determine a nominal discrete Fourier transform (DFT)-based matrix having a size equal to the determined total number of frequency resources in the set of contiguous frequency resources; and perform the frequency domain compression of the set of contiguous frequency resources using the nominal DFT-based matrix.

18. The user equipment of claim 17, wherein the one or more processors are configured to cause the user equipment to:

report, for a first set of the non-contiguous sets of contiguous frequency resources, a first subset of frequency domain compression matrix basis, wherein a total number of the first subset of frequency domain compression basis is determined based at least in part on the total number of frequency resources in the first set of contiguous resources; and report, for a second set of the non-contiguous sets of contiguous frequency resources, a second subset of frequency domain compression matrix basis, wherein a total number of the second subset of frequency domain compression basis is determined based at least in part on the total number of frequency resources in the second set of contiguous resources.

19. The user equipment of claim 18, wherein the one or more processors are configured to cause the user equipment to:

report, for the first subset of frequency domain compression matrix basis, a first subset of linear combination coefficients; and report, for the second subset of frequency domain compression matrix basis, a second subset of linear combination coefficients.

20. The user equipment of claim 18, wherein the one or more processors are configured to cause the user equipment to report a subset of linear combination coefficients for the first and second subsets of frequency compression matrix basis across all of the non-contiguous sets of contiguous frequency resources.

21. The user equipment of claim 17, wherein the one or more processors are configured to cause the user equipment to report a subset of frequency domain compression matrix basis across all of the non-contiguous sets of contiguous frequency resources, wherein a total number of frequency domain compression matrix basis in the subset of frequency domain compression matrix basis is based at least in part on the total number of frequency resources across all the non-contiguous sets of contiguous frequency resources.

22. The user equipment of claim 16, wherein the non-contiguous sets of contiguous frequency resources comprise evenly spaced frequency resources.

23. The user equipment of claim 16, wherein the one or more processors are configured to cause the user equipment to skip frequency domain compression of precoding matrix information when the number of configured frequency resources is smaller than a threshold.

24. A network entity comprising:

memory storing computer executable code thereon; and one or more processors coupled with the memory and configured to execute the computer executable code and cause the network entity to:

send a channel state information (CSI) report configuration configuring a user equipment (UE) for reporting at least a subset of precoding matrix information including a plurality of selected beams, a frequency domain compression matrix for each of the plurality of beams at each of a plurality of taps in the time domain, and a subset of a plurality of linear combination coefficients associated with the frequency domain compression matrices and the plurality of beams;

send the UE a configuration of non-contiguous sets of contiguous frequency resources for CSI reporting;

receive an indication from the UE of a nominal discrete Fourier transform (DFT)-based matrix used for frequency domain compression at the UE; and perform separate frequency domain decompression of the precoding matrix information from the UE, based on the nominal DFT-based matrix, for each set of the non-contiguous sets of contiguous frequency resources to obtain the precoding matrix information.

25. The network entity of claim 24, wherein the one or more processors are configured to cause the network entity to:

receive a first report from the UE for a first set of the contiguous frequency resources, the first report reporting a first subset of frequency domain compression matrix basis, wherein a total number of the first subset of frequency domain compression matrix basis is based at least in part on the total number of frequency resources in the first set of the contiguous frequency resources; and receive a second report from the UE, for a second set of the contiguous frequency resources, the second report reporting a second subset of frequency domain compression matrix basis, wherein a total number of the second subset of frequency domain compression matrix basis is based at least in part on the total number of frequency resources in the second set of the contiguous frequency resources.

26. The network entity of claim 25, wherein the one or more processors are configured to cause the user equipment to receive a report from the UE reporting a subset of frequency domain compression matrix basis across all of the non-contiguous sets of contiguous frequency resources, wherein a total number of frequency domain compression matrix basis in the subset of frequency domain compression matrix is based at least in part on the total number of frequency resources across all the non-contiguous sets of contiguous frequency resources.

\* \* \* \* \*